United States Patent
Benken et al.

(10) Patent No.: US 12,163,854 B2
(45) Date of Patent: Dec. 10, 2024

(54) CAPACITIVE PRESSURE SENSOR DEVICE INCLUDING LOWER AND UPPER ELECTRODES

(71) Applicant: The Regents of the University of Michigan, Ann Arbor, MI (US)

(72) Inventors: Alexander Benken, Ann Arbor, MI (US); Yogesh Gianchandani, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 365 days.

(21) Appl. No.: 17/668,136

(22) Filed: Feb. 9, 2022

(65) Prior Publication Data

US 2022/0268653 A1 Aug. 25, 2022

Related U.S. Application Data

(60) Provisional application No. 63/147,939, filed on Feb. 10, 2021.

(51) Int. Cl.
*G01L 9/00* (2006.01)

(52) U.S. Cl.
CPC .......... *G01L 9/0073* (2013.01); *G01L 9/0042* (2013.01)

(58) Field of Classification Search
None
See application file for complete search history.

(56) References Cited

U.S. PATENT DOCUMENTS

| | | | |
|---|---|---|---|
| 4,386,453 A | 6/1983 | Giachino et al. | |
| 5,470,797 A | 11/1995 | Mastrangelo | |
| 6,156,585 A * | 12/2000 | Gogoi | G01L 9/0042 438/48 |
| 6,640,643 B2 * | 11/2003 | Ishio | G01L 9/0042 73/718 |
| 8,592,877 B2 * | 11/2013 | Lakamraju | B81C 1/00246 257/254 |
| 8,638,106 B2 | 1/2014 | Gianchandani et al. | |
| 8,754,453 B2 * | 6/2014 | Hwang | H01L 29/66007 438/419 |
| 9,463,975 B2 * | 10/2016 | Hong | B81C 1/00166 |
| 9,567,209 B1 * | 2/2017 | Cheng | G01L 9/0044 |

(Continued)

OTHER PUBLICATIONS

Capacitive Pressure Sensor E1.3N, Preliminary Data Sheet, microFAB Bremen GmbH, Sep. 1, 2008, 6 pages.

(Continued)

*Primary Examiner* — Peter J Macchiarolo
*Assistant Examiner* — Jermaine L Jenkins
(74) *Attorney, Agent, or Firm* — Lempia Summerfield Katz LLC (57) ABSTRACT

A capacitive sensor device is fabricated on a dielectric substrate. The capacitive sensor device may include multiple diaphragms that differ in shape and/or size. Each of the diaphragms is paired to upper and lower electrodes in included upper and lower electrode layers, respectively. The lower layer is on the dielectric substrate and couples the lower electrodes to a lower electrode terminal in parallel. The upper electrode layer is separated from the lower electrode layer by a gap defined by a removed sacrificial layer and couples the upper electrodes in parallel to an upper electrode terminal.

20 Claims, 9 Drawing Sheets

(56) References Cited

U.S. PATENT DOCUMENTS

| | | | |
|---|---|---|---|
| 9,950,922 | B2 | 4/2018 | Gianchandani et al. |
| 10,006,823 | B2 | 6/2018 | Gianchandani et al. |
| 10,782,446 | B2 | 9/2020 | Li et al. |
| 11,585,711 | B2 * | 2/2023 | Besling ................. G01L 9/0073 |
| 2011/0108932 | A1 * | 5/2011 | Benzel .................. G01L 9/0073 |
| | | | 257/E21.002 |
| 2013/0285171 | A1 | 10/2013 | Najafi et al. |
| 2021/0403315 | A1 * | 12/2021 | Artmann ............... B81B 3/0072 |
| 2022/0396477 | A1 * | 12/2022 | Weber .................... H04R 19/04 |

OTHER PUBLICATIONS

Chau et al., "Scaling Limits in BatcIn-Fabricated Silicon Pressure Sensors", IEEE Transactions on Electron Devices, Apr. 1987, pp. 850-858, vol. ED-34, No. 4.

Crary et al., "Digital Compensation of High-performance Silicon Pressure Transducers", Sensors and Actuators, A21-A23, 1990, pp. 70-72.

Eun et al., "A Microdischarge-Based Monolithic Pressure Sensor", Journal of Microelectromechanical Systems, Dec. 2014, 11 pages, vol. 23, No. 6.

Honeywell, Sensing and Control, Pressure Sensors, 13 mm Series, 2004, 8 pages.

Ji et al., "An Ultraminiature CMOS Pressure Sensor for a Multiplexed Cardiovascular Catheter", 1991 International Conference on Solid-State Sensors and Actuators, Jun. 1991, pp. 1018-1020.

Lee et al., "A Batch-Fabricated Silicon Capacitive Pressure Transducer with Low Temperature Sensitivity", IEEE Transactions on Electron Devices, Jan. 1982, pp. 42-48, vol. ED-29, No. 1.

Murata, Product Family Specification, SCB10H Series, Nov. 10, 2012, 19 pages.

Wang et al., "A Novel Electrostatic Servo Capacitive Vacuum Sensor", 1997 International Conference on Solid- State Sensors and Actuators, Jun. 16-19, 1997, 4D3.03, pp. 1457-1460.

Yozo Kanda, "A Graphical Representation of the Piezoresistance Coefficients in Silicon", IEEE Transactions on Electron Devices, Jan. 1982, pp. 64-70, vol. ED-29, No. 1.

Chavan et al., "Batch-Processed Vacuum-Sealed Capacitive Pressure Sensors," Journal of Microelectromechanical Systems, vol. 10, No. 4, Dec. 2001.

Luo, et al., "A Microdischarge-Based Pressure Sensor Fabricated Using Through-Wafer Isolated Bulk-Silicon Lead Transfer," Journal of Microelectromechanical Systems, vol. 27, No. 2, Apr. 2018.

"24-Bit Capacitance-to-Digital Converter with Temperature Sensor", data sheet, Analog Devices, 2005, 28 pages.

An et al., "Vacuum sealing using atomic layer deposition of Al2O3 at 250°C", J. Vac. Sci. Technol. A 32(1), Jan./Feb. 2014, 5 pages.

Anstead et al., "Thermal Effects on the Integrity of Aluminum to Silicon Contacts in Silicon Integrated Circuits", IEEE Transactions on Electron Devices, Apr. 1969, pp. 381-386, vol. ED-16, No. 4.

Chau et al., "An Ultraminiature Solid-State Pressure Sensor for a Cardiovascular Catheter", IEEE Transactions on Electron Devices, Dec. 1988, pp. 2355-2362, vol. 35, No. 12.

Chavan et al., Batch-Processed Vacuum-Sealed Capacitive Pressure Sensors, Journal of Microelectromechanical Systems, Dec. 2001, pp. 580-588, vol. 10, No. 4.

Chen et al., "A Silicon Carbide Capacitive Pressure Sensor for In-Cylinder Pressure Measurement", Sensors and Actuators A 145-146 (2008) 2-8, 7 pages.

Cho et al., "An Ultrasensitive Silicon Pressure-Based Microflow Sensor", IEEE Transactions on Electron Devices, Apr. 1992, pp. 825-835, vol. 39, No. 4.

Chou et al., "An Innovative Pirani Pressure Sensor", 1997 International Conference on Solid-State Sensors and Actuators, Jun. 16-19, 1997, pp. 1465-1468.

Huang et al., "Effect of deposition conditions on mechanical properties of low-temperature PECVD silicon nitride films", Materials Science and Engineering A 435-436 (2006) 453-459.

Ikeda et al., "Silicon Pressure Sensor Integrates Resonant Strain Gauge on Diaphragm", Sensors and Actuators, A21-23 (1990) 146-150.

Jin et al., "Silicon Carbide Pressure Sensor for High Temperature and High Pressure Applications: Influence of Substrate Material on Performance", Transducers' 11, Beijing, China, Jun. 5-9, 2011, pp. 2026-2029.

Kim et al., "SiO2 Nanorod Thin Film Encapsulated by Al2O3 with Atomic Layer Deposition and its Optical Application", 2008 8th IEEE Conference on Nanotechnology, 4 pages.

Luo et al., "A 100 um diameter capacitive pressure sensor with 50 MPa dynamic range", J. Micromech. Microeng. 26 (2016) 045009 (10pp), 11 pages.

Martyniuk et al., "Stress response of low temperature PECVD silicon nitride thin films to cryogenic thermal cycling", Conference on Optoelectronic and Microelectronic Materials and Devices, 2004, 4 pages.

Mounier et al., "Status of the MEMS Industry 2016", Market & Technology report, Yole Développement, May 2016, 5 pages.

Narakathu et al., "A Novel Fully Printed and Flexible Capacitive Pressure Sensor", Sensors, 2012, 4 pages.

Park et al., "A Servo-Controlled Capacitive Pressure Sensor Using a Capped-Cylinder Structure Microfabricated by a Three-Mask Process", Journal of Microelectromechanical Systems, Apr. 2003, pp. 209-220, vol. 12, No. 2.

Puers et al., "A Capacitive Pressure Sensor with Low Impedance Output and Active Suppression of Parasitic Effects", Sensors and Actuators, A21-A23 (1990) 108-114.

Riethmüller et al., "Thermally Excited Silicon Microactuators", IEEE Transactions on Electron Devices, Jun. 1988, pp. 758-463, vol. 35, No. 6.

Samaun et al., "An IC Piezoresistive Pressure Sensor for Biomedical Instrumentation", IEEE Transactions on Biomedical Engineering, Mar. 1973, pp. 101-109.

Sander et al., "A Monolithic Capacitive Pressure Sensor with Pulse-Period Output", IEEE Transactions on Electron Devices, May 1980, pp. 927-930, vol. ED-27, No. 5.

Smartball Flowable Pressure and Temperature Micro-Recorder, data sheet, Openfield Technology, 2011-2013, 4 pages.

Y.B. Gianchandani, C. Wilson, and J.-S. Park, "Micromachined Pressure Sensors: Devices, Interface Circuits, and Performance Limits" in The MEMS Handbook, 2nd Edition, ed. M. Gad-el-Hak, CRC Press, 2006, pp. 3.1-3.44.

Yang et al., "The Latest Plasma-Enhanced Chemical-Vapor Deposition Technology for Large-Size Processing", Journal of Display Technology, Dec. 2007, pp. 386-391, vol. 3, No. 4.

Yeh et al., "A Low-Voltage Bulk-Silicon Tunneling-Based Microaccelerometer", Proceedings of International Electron Devices Meeting, 1995, pp. 593-596.

* cited by examiner

CAPACITIVE PRESSURE SENSOR DEVICE INCLUDING LOWER AND UPPER ELECTRODES

PRIORITY

This application claims the benefit of U.S. provisional application entitled "SAPPHIRE SUBSTRATE ARRAYED DIAPHRAGM CAPACITIVE PRESSURE SENSOR," filed Feb. 10, 2021, and assigned Ser. No. 63/147,939, the entire disclosure of which is hereby expressly incorporated by reference.

BACKGROUND

Technical Field

The disclosure relates generally to capacitive pressure sensors.

Brief Description of Related Technology

In recent years, the use of microsensors has grown exponentially. As an example, microsensors for pressure contributed to 1.5 billion in device sales in 2017. In industries varying from healthcare to automotive applications, microsensors have contributed to the creation of a new generation of devices that are both compact and multifunctional. Further improvements to the performance of such microsensors will continue to drive sales.

DETAILED DESCRIPTION

In various contexts, pressure sensors fabricated as microsensor devices may exhibit performance effects due to parasitic capacitance. In some cases, proximity to substrates and other layers may cause parasitic capacitance effects in electrode layer within a device. In some cases, the magnitude of such parasitic capacitance may be affected by the particular material of the substrates or layers contributing to the effects. For example, semiconductor and/or conductor materials may, in some cases, have a larger contribution than similarly proximate and sized dielectric substrates and/or layers. A parasitic effect may include an effect occurring during operation of a device that detracts from the desired performance effects of the device.

Because proximity may play a role in parasitic capacitance, the conventional wisdom has dictated that a large separation between upper and lower pressure sensor electrodes is necessary both to decrease electrode proximity to other layers and to ensure that electrode-to-electrode capacitance effects overcome parasitic effects. In addition, conventional wisdom has dictated semiconductor substrate fabrication processes be used for compact pressure sensor design because of the complexity of the pressure sensor design (e.g., gaps between layers and robustness under deformation). Thus, conventional wisdom has dictated that pressure sensors that are both compact and complex may not be achieved using dielectric substrates.

Contrary to conventional wisdom, the techniques and architectures discussed herein may provide for a compact pressure sensor using a dielectric substrate. For example, to proceed contrary to the conventional wisdom using dielectric substrate fabrication processes, the techniques and architectures implement a sacrificial layer that is patterned on top of the device and then (at least partially) removed to achieve separation between the upper and lower electrodes.

Although the techniques and architectures proceed in a manner contrary to the conventional wisdom to allow for compact pressure sensor design, the techniques and architectures discussed herein may be used to create devices that are not necessarily compact. For example, the active area of the devices discussed herein may be scaled by adjusting the number and relative positions of the diaphragms in the devices. Further, non-pressure sensing devices may be fabricated. For example, the techniques and architectures discussed herein may be used to measure position deflection, detect vibration, track device wear, and/or other position/force/impact sensing applications.

The techniques and architectures discussed herein rely on fundamental laws and abstract ideas. In some fashion, all devices, all methods, and all systems rely on such laws and ideas. However, the techniques and architectures discussed herein are not directed to such laws or ideas. Rather, the techniques and architectures use engineering and particularized design to create a practical sensing device. For example, the techniques and architectures use materials formed into particular structures which are not abstract even if the design of such is influenced by fundamental laws and abstract ideas. Nothing herein prevents others from using the very same fundamental laws and the very same abstract ideas to produce other structures.

Figure 1:
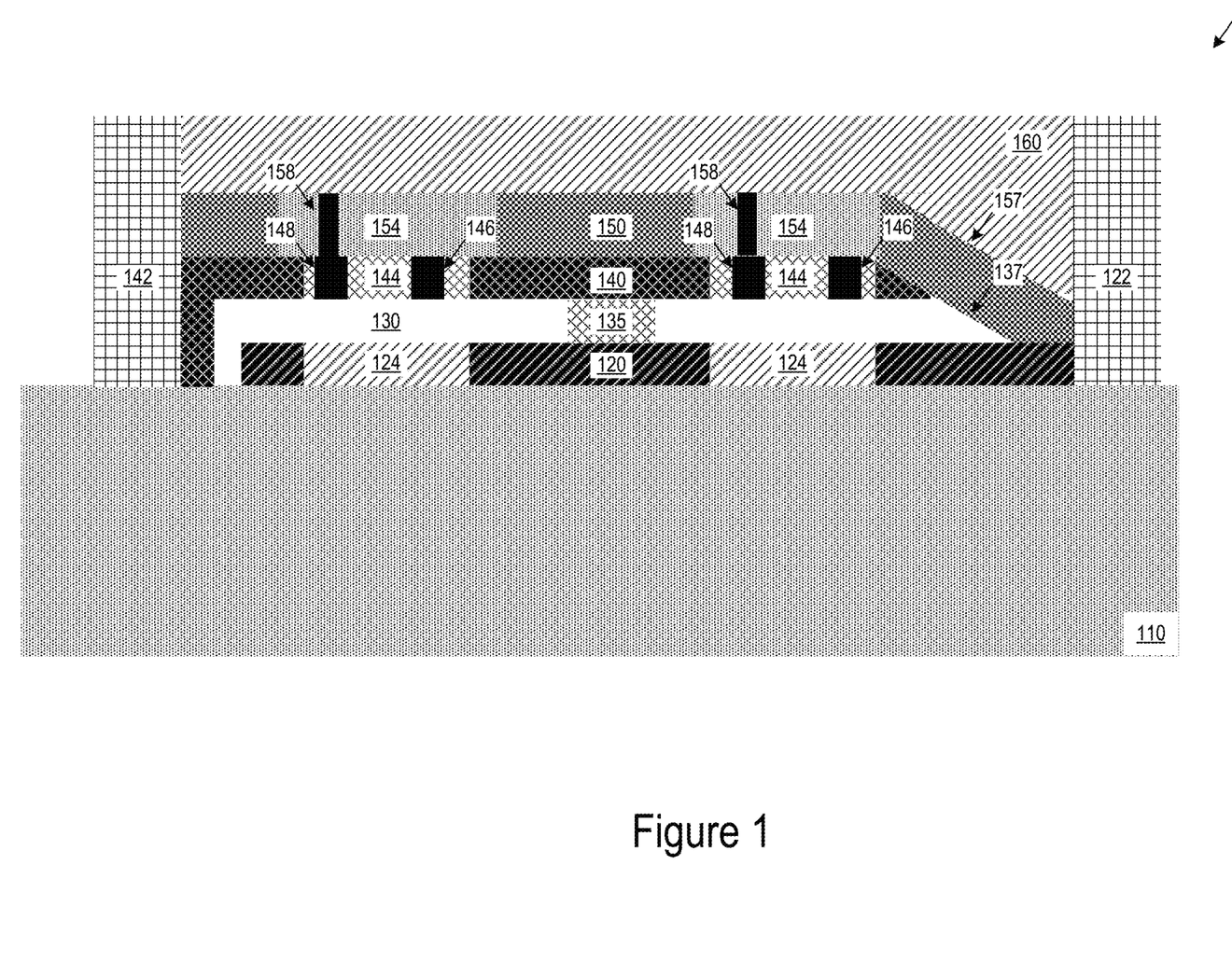
FIG. 1 shows an example capacitive device.

FIG. 1 shows an example capacitive device 100. The example capacitive device 100 may include a dielectric substrate 110, a lower electrode layer 120, a sacrificial layer gap 130 (where a sacrificial layer 135 was at least partially removed), an upper electrode layer 140, a diaphragm layer 150, and a cap-seal layer 160. The capacitive device may include a lower electrode terminal 122 and an upper electrode terminal 142.

The dielectric substrate 110 may include materials such as sapphire and/or other dielectric materials. The dielectric substrate 110 may have thickness that isolates the electric field of the electrodes from conductive and/or semiconductive materials that may be present in or bonded to the dielectric substrate. For example, in some cases, the dielectric substrate 110 may include a layer that is at least 50 microns thick.

The dielectric substrate may be homogeneous. For example, the dielectric substrate 110 may be substantially formed from a single material that is the same throughout the expanse of the substrate. In some cases, the dielectric substrate 110 may be homogenous with regard to dielectric constant. For example, the dielectric substrate may be formed from multiple materials with similar electrical responses, but that differ in other material properties. For example, a system may utilize a first material as a base layer to provide material robustness while a second material may be selected for compatibility with surface fabrication techniques.

The lower electrode layer 120 may include a lower electrode 124 paired to a diaphragm 154 in the diaphragm layer 150. The various lower electrodes 124 paired to the diaphragms 154 may be connected in parallel to the lower electrode terminal 122. The lower electrode layer may be formed using a conductive material such as aluminum or other conductive material. The electrode layers may include sub-layers that may provide anticorrosion, robustness, additional conductivity, or other properties. For example, the electrode layers may include an aluminum center layer with titanium outer layers to reduce corrosion, increase layer robustness, adjust temperature stability, reduce inter-layer interaction, or otherwise control the material properties of the electrode layers.

In the device the lower electrodes may be denoted "lower" in reference to the "upper" electrodes based on their relative distances from the dielectric substrate. Accordingly, lower layers may be closer to the substrate and upper layers may be relatively farther from the substrate. The lower electrode terminal and upper electrode terminal may not necessarily have any particular spatial relationship or patterning order relative to one another. The lower and upper electrode terminals are designated "lower" and "upper" to indicate the electrode layer to which the terminal is coupled.

The electrode terminals may be formed from conductive materials such as nickel and/or gold. To mitigate parasitic capacitive effects (e.g., beyond the mitigation provided via the use of a dielectric substrate), the electrode layers and/or the electrode terminals may be in physical contact with the substrate surface.

In various implementations, an insulating layer such as a nitride layer (not shown) may be deposited on top of the lower electrode layer 120. In some cases, such insulating layers may ensure that the upper and lower electrodes layers do not come into contact during operation of the sensor (e.g., to prevent metal-to-metal bonding, direct electrical contact, and/or other undesired operation).

The sacrificial layer gap 130 may be above the lower electrode layer 120. The sacrificial layer gap 130 may be formed through the application of a sacrificial layer 135 that may be at least partially removed. In some cases, the sacrificial layer 135 may be fully removed. The sacrificial layer 135 may be formed using a material compatible with surface micromachining, such that it may be removed via application of an etchant. For example, an α-Si layer may be patterned as the sacrificial layer 135. A suitable etchant for such an example sacrificial layer may include gas phase XeF$_2$. In the case of an α-Si layer, full removal may mitigate parasitic capacitive effects that the α-Si may cause with regard to the electrode layers.

The height of the sacrificial layer gap 130 may be selected by controlling the thickness of the sacrificial layer 135. In some cases, a sacrificial layer gap 130 less than 1 micron may be used. For example, a sacrificial layer gap 130 of about 500 nm (e.g., between 350 nm-750 nm) may be used.

In some implementations, the sidewalls of the sacrificial layer 135 may be tapered (e.g., other than vertical). The tapers 137 may be linear (e.g., straight tapers), curved tapers, stepwise, and/or other taper types. The use of tapered sidewalls 137 may allow for sloped sidewalls 157 of various layers above the sacrificial layer gap 130. Sloped sidewalls 157 may allow for more uniform thickness where the layers of above the sacrificial layer gap 130 shift upward at the start of the sacrificial layer gap 130. Rather than having a vertical sidewall form in the upper layers at the edge of the sacrificial layer gap 130, more gently sloped sidewall 157 forms. The sloped sidewall 157 may avoid thinning and stress points in the diaphragm layer 150 that may degrade when the diaphragms 154 are deformed.

The upper electrode layer 140 may be above the sacrificial layer gap 130 and applied before the removal of the sacrificial layer 135. As discussed above, the upper electrode layer may be formed from conductive materials and may, in some cases, include multiple sub-layers. The upper electrode layer may include electrodes that may be (e.g., along with a corresponding lower electrode) paired to the diaphragms in the diaphragm layer 150. The upper electrodes may be coupled in parallel to the upper electrode terminal 142.

The upper electrodes 144 may include one or more deformation apertures 146 and/or one or more etchant apertures 148. The deformation apertures 146 (which may also serve as etchant apertures) may be structured to mitigate temperature (e.g., expansion/contraction) effects that may cause an upper electrode 144 to deform the paired diaphragm. Accordingly, the deformation apertures 146 may allow the sensor to have consistent performance over an increased temperature range (e.g., relative to that achievable without such apertures).

The upper electrodes 144 may also include one or more etchant apertures 148. The etchant apertures 148 may include openings in the electrode to allow for the passage of a fluid etchant (e.g., such as gas-phase or liquid-phase etchants). The etchant apertures 148 may be paired to etchant apertures 158 in the diaphragms 154 to allow permeation through both layers. In various implementations, the etchant apertures 148 may also serve as deformation apertures, as discussed above.

The diaphragm layer 150 may be above the upper electrode layer 140. The diaphragm layer 150 may include diaphragms 154 paired with upper and lower electrodes. In various implementations, the diaphragm layer 150 may include various sub-layers (not shown). For example, the diaphragm layer may include a silicon nitride layer between two silicon oxide layers. In some cases, the sub-layers of the diaphragm layer may be applied with different patterns. For example, the diaphragms may be patterned into a first sub-layer while one or more reinforcement sub-layers may be patterned without the diaphragms to increase the robustness of the diaphragm layer as a whole (e.g., by reducing stress points around the edges of the diaphragms 154).

The diaphragms 154 may be heterogenous (e.g., the diaphragms may have different physical characteristics such as shape and size). The use of heterogenous diaphragms with corresponding electrodes connected in parallel allow the response (e.g. the capacitive response) of the device to be controlled via the selection of the diaphragms. For example, diaphragms with two different radii may be selected to increase the range of pressures over which the device 100 will have a response (e.g., since the different diaphragms may reach their respective maximum deformations at different pressure levels). In an example, the heterogenous diaphragms may be selected such that the response of the device is enhanced (e.g., over a particular range of pressures).

In some cases, a heterogenous diaphragm array (which may include up to tens or hundreds of diaphragms or more) may be used to control response of the device. In some cases, a full-scale response (e.g., the response of the device from a defined start pressure to a response saturation point) may be controlled by forming an array. In some cases, as discussed in the example implementations below, full-scale responses (measured from ambient pressure to the point at which the incremental response of the device falls below 30% of the incremental response at ambient pressure) may be up to 10-100 megapascals or more.

The cap-seal layer 160 may include one or more layers to cap and/or seal the device to ensure isolation and protection of the device components. Various configurations of layers may be used. For example, a layer with multiple sub-layers may be applied as a cap and/or sealing layer. As an illustrative example, a three-sub-layer nitride-oxide-nitride layer may be applied over the diaphragm layer to provide capping. In turn, an $Al_2O_3$ layer may be applied over the three-sub-layer nitride-oxide-nitride layer to hermetically seal the device. Other capping/sealing combinations may be used.

Figure 2:
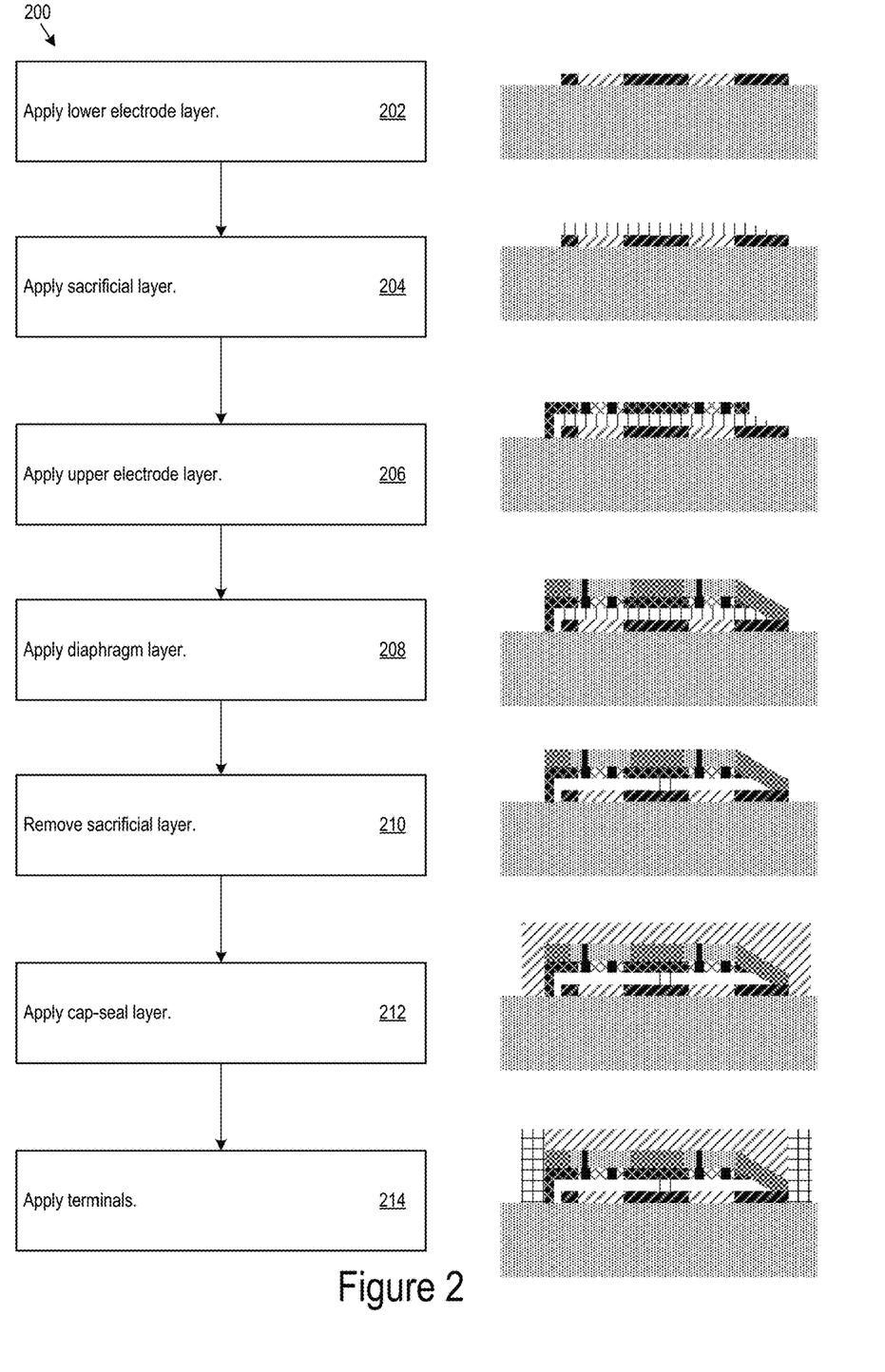
FIG. 2 shows an example method of manufacture for a capacitive device.

FIG. 2 shows an example method of manufacture 200 for a capacitive device 100. The lower electrode layer 120 may be applied to the dielectric substrate 110 (202). In an illustrative example, the lower electrode layer 120 may be formed through evaporation of metal for the layer (in some cases, sub-layers). In implementations where a nitride layer (or other insulation layer) is used, the nitride layer may be applied via plasma enhanced chemical vapor deposition (PECVD).

The sacrificial layer 135 may be applied above the lower electrode layer 120 (204). For an α-Si layer, PECVD may be used. As discussed above, the sacrificial layer 135 may be formed with tapered sidewalls.

The upper electrode layer 140 may be applied above the sacrificial layer 135 (206). As discussed above, the upper electrode layer 140 may be formed with various apertures to mitigate temperature-effects and to facilitate (full/partial) removal of the sacrificial layer 135. The upper electro layer may be formed using sputter coating. However, various evaporative, spray, and/or thermal coating techniques may be used.

The diaphragm layer 150 may be applied above the upper electrode layer 140 (208). In some cases, the diaphragm layer 150 may include multiple sub-layers of different materials, such as a silicon nitride layer between two silicon dioxide layers. Further, the diaphragms 154 may be patterned into a subset of the sub-layer and not the other reinforcement sub-layers. Accordingly, the diaphragm layer 150 may be applied using multiple methods, for example PECVD with and without diaphragm patterning. The diaphragm layer may include apertures (such as etchant slits) to facilitate removal of the sacrificial layer 135.

As discussed above, in some cases, the diaphragm layer 150 may be applied above a tapered sidewall of the sacrificial layer 135. The resultant upward shifts in the diaphragm layer 150 then occurs as an upward sloped sidewall rather than forming a vertical sidewall.

The sacrificial layer 135 may be removed (210). In various implementations, the sacrificial layer 135 may be removed via surface micromachining (e.g., etching). In some cases, gas-phase $XeF_2$ may be used as the etchant. However, various other fluid-phase etchants suitable for the material of the sacrificial layer 135 may be used.

After removal of the sacrificial layer 135, the cap-seal layer 160 (or layers) may be applied above the diaphragm layer 150 (212). The cap-seal layer 160 may be applied via various techniques depending on the materials used for the one or more layers. As an illustrative example, a three-sub-layer nitride-oxide-nitride layer may be applied using PECVD, while an $Al_2O_3$ layer may be applied via atomic layer deposition (ALD) to provide hermetic sealing.

The cap-seal layer 160 may be selectively removed from the locations for the upper 142 and lower 122 electrode terminals and the electrode terminals may be applied (214). In some cases, the electrode terminals may be applied to ensure contact between the electrode layers 120, 140 and the substrate 110 surface.

Example Implementations

Various illustrative example implementations are included below. The illustrative example implementations are illustrative of the general architectures and techniques described above and, in the claims, below. Descriptions of particular features are included to clarify the relationship of that particular feature to the specific illustrative scenario/scenarios in which the particular feature is discussed. A relationship to the same degree may not necessarily be present in other implementations. Nevertheless, the various features described with respect to the individual example implementations may be readily and optionally integrated with other implementations with or without various other features present in the respective example implementation.

The susceptibility of capacitance-to-digital converters to large parasitic and offset capacitances may be a factor in practical importance. As the offset and parasitic capacitances of the sensor chip increase, the pressure resolution available from the readout circuit generally decreases. One approach to reduce parasitic capacitance is to use substrates made of insulating materials rather than silicon.

Figure 3:
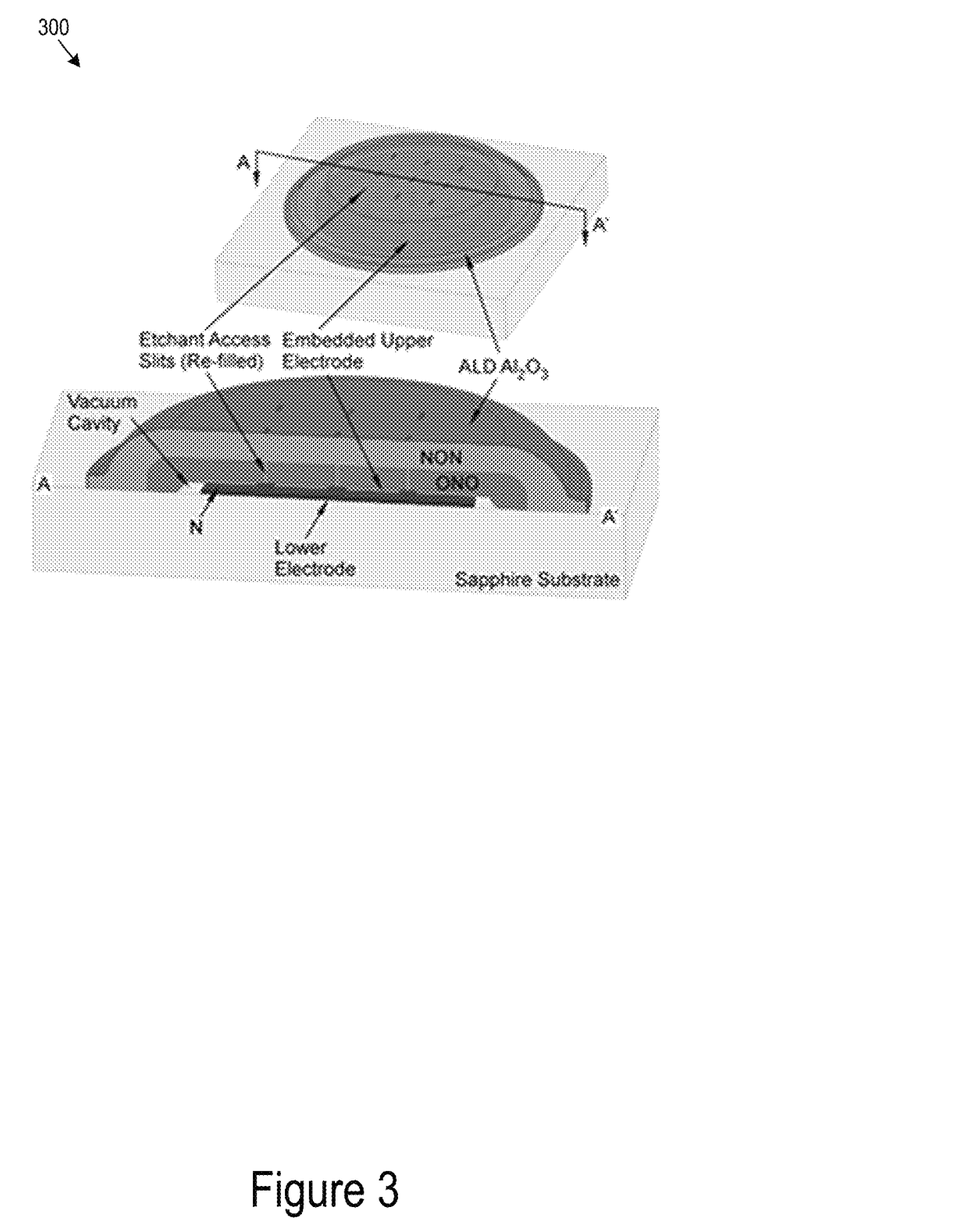
FIG. 3 shows a three-dimensional view of an example capacitive pressure sensor diaphragm.

FIG. 3 shows a three-dimensional view of an example capacitive pressure sensor diaphragm 300. In FIG. 3, the labels "O" and "N" are used to represent silicon dioxide and silicon nitride, respectively.

The sensor structure includes a deformable dielectric diaphragm with an embedded metal electrode above a vacuum sealed cavity (e.g., a sacrificial gap layer) and lower electrode on a sapphire substrate. The lower electrode maybe insulated with dielectric to allow contact mode operation of the pressure sensors.

As illustrative example considerations, sensor chip designs may be based on the parametric analysis of physical diaphragm features including inter-electrode chamber gap, g, diaphragm thickness, h, and diaphragm diameter. Boundary conditions were established by noting both physical fabrication limitations and sensor performance. For example, a smaller nominal gap, g, risks diaphragm-substrate contact during sealing in the fabrication (immobilizing the diaphragm) and large values require longer PECVD deposition. Diaphragms with smaller diameters are less sensitive to pressure, whereas those with a larger diameter sacrifice full-scale range and fabrication yield. The diaphragm thickness can present a compromise, as thickness <4.0 μm cannot seal the etchant access slits and thickness >5.0 μm reduces yield with excessive stress, leading to diaphragm rupture. Material properties, namely Young's Modulus (E), sensor cavity RMS surface roughness ($R_q$), and electrode insulation's relative permittivity ($\varepsilon_r$), were determined from fitted values of previous fabrication generations, permitting a high level of confidence in the analysis. The final set of process parameters identified for the presented process were an inter-electrode chamber gap, g, of 500 nm and diaphragm thickness, h, of 4.5 μm which permitted the design of sensor chips with the desired full-scale ranges by altering only the lithographically defined diameter.

As working examples, four sensor chips having arrayed diaphragms were developed, with two intended for high full-scale range. One pair of sensor chip designs used arrays with a single diaphragm diameter (i.e., homogenous arrays) to increase capacitance response. The large full-scale range is addressed by a working example sensor chip, which is an array of 18 diaphragms of ø100 µm diameter, occupying 0.35 mm² active area, and providing a full-scale range of 30 MPa. In accordance with embodiments of the present disclosure, a lower boundary of the full-scale range is identified as the ambient atmospheric pressure, whereas an upper boundary is identified as the applied pressure at which the incremental response falls below 30% of the incremental response at the lower boundary (and the response capacitive response curve is flatter). The other homogeneous array, another working example sensor chip, includes 8 diaphragms of ø200 µm diameter, occupying 0.40 mm² active area; this has a full-scale range of only 0.07 MPa. In homogeneous arrays, all diaphragms are of the same size, and consequently transition from non-contact mode to contact mode at the same pressure.

As further working examples, a second pair of arrayed sensor chips were developed, which incorporated multiple diaphragm diameters (i.e., heterogeneous arrays) to not only increase the capacitance response, but also modify it over a wider operating range by judiciously distributing across the full-scale range the pressure values at which diaphragms transition from non-contact mode to contact mode. A heterogeneous array for large full-scale range was manifest in yet another working example sensor chip, which incorporated 85 diaphragms with diameters ranging from ø56 µm-92 µm (ten each of ø56 µm, ø57 µm, ø59 µm, ø61 µm, ø63 µm, and ø65 µm, and five each of ø68 µm, ø72 µm, ø78 µm, ø82 µm, and ø92 µm). For a smaller full-scale range, a heterogeneous sensor chip, designated as 32C110-150, incorporated 32 diaphragms ranging from ø110 µm-ø150 µm (twelve ø110 µm, eight ø120 µm, and four each of ø130 µm, ø140 µm, and ø150 µm). A sensor chip, designated as C100, incorporating a single ø100 µm diameter diaphragm, was also fabricated, benchmarking the array.

Figure 4:
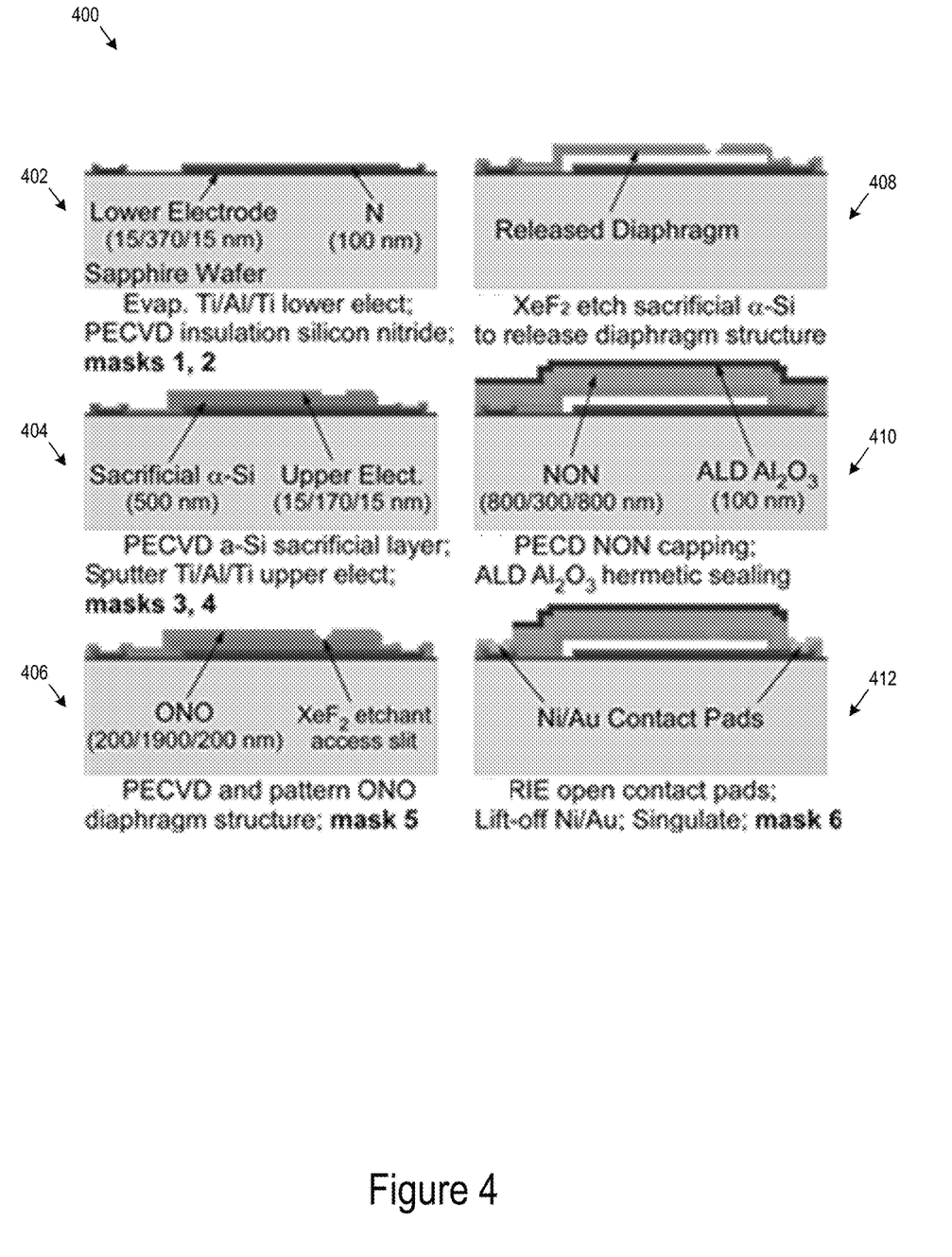
FIG. 4 shows an illustrative working example fabrication process for sensor chips.

FIG. 4 shows an illustrative working example fabrication process for sensor chips. In In FIG. 4, the labels "O" and "N" are used to represent silicon dioxide and silicon nitride, respectively.

In the illustrative working examples, the fabrication process used six lithographic masks and only low-temperature steps; i.e., furnaces were not used. Referring to FIG. 4, the lower electrode (Ti/Al/Ti, 15/370/15 nm) was deposited on a sapphire substrate and then patterned (402); this was followed by plasma-enhanced chemical vapor deposition ("PECVD") of insulation silicon nitride dielectric (100 nm). A sacrificial amorphous silicon ($\alpha$-Si) layer (500 nm) was used to define the nominal inter-electrode cavity gap, g, and diaphragm diameter; the $\alpha$-Si was deposited by PECVD and patterned by a plasma etch (404). The upper electrode was deposited by sputtering (Ti/Al/Ti, 15/170/15 nm). After patterning, this was followed by PECVD deposition of the first structural dielectric diaphragm layer that was composed of silicon oxide, nitride, oxide (ONO, 200/1900/200 nm) (406). The ONO was patterned by dry etching to create etchant access slits. The $\alpha$-Si was then removed using gas phase $XeF_2$ (408). The released diaphragm was then sealed using additional PECVD dielectrics (NON, 800/300/800 nm) (410). Contact pads were opened by a plasma etch of the dielectrics over the pad locations and additional metal layers (Ni, Au) were deposited for compatibility with PCB assembly (412). Sensor chips were individually singulated using conventional dicing.

The working example process flow incorporated a number of considerations that increased diaphragm yield, reduced offset and parasitic capacitances, and provided extraordinarily high output capacitance response in a small footprint. Example considerations may include:

(i) In the Ti/Al/Ti stack that includes the lower electrode, the top Ti layer prevents direct contact between the $\alpha$-Si and aluminum in order to prevent aluminum spiking. Although the highest process temperature (400° C.) is below the Si/Al eutectic temperature (577° C.), the impure composition and non-crystalline nature of $\alpha$-Si [26] may allow inter-diffusion at lower temperatures than the eutectic temperature; the Ti layer serves as a barrier.

Figure 5:
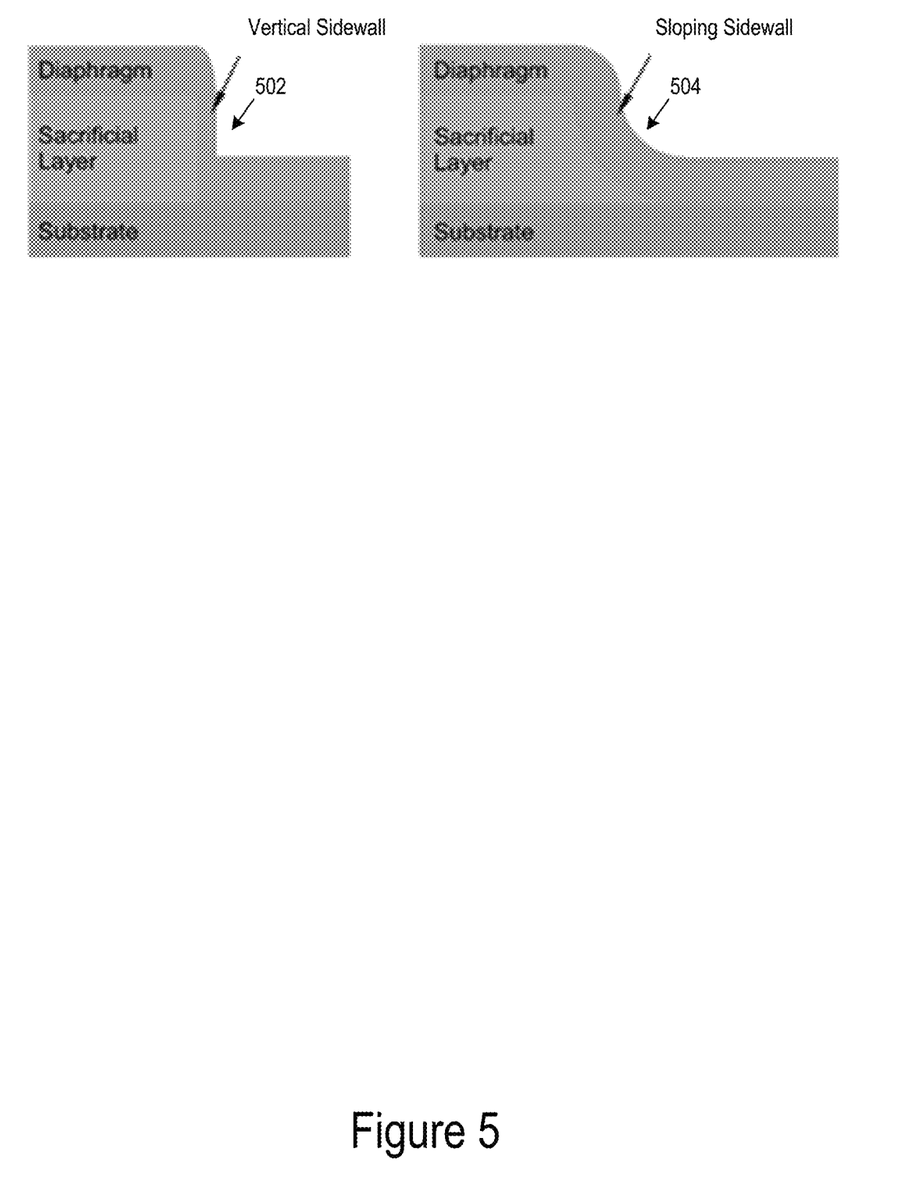
FIG. 5 shows example patterning results for different example sidewall types.

(ii) The patterning of the sacrificial $\alpha$-Si may utilize a custom isotropic etch to provide a sloping sidewall profile, improving step coverage for both the upper electrode lead and the dielectric diaphragm. During sensor operation at high pressure, stress on the element diaphragm may be minimized to prevent diaphragm failure. FIG. 5 shows example patterning results 502, 504 for different example sidewall types. Referring to FIG. 5, when traditional anisotropic reactive ion etching is used to etch the sacrificial layer of the diaphragm, vertical sidewalls are created, which creates a single sharp sidewall 502 (which can result in a stress concentration point). The deposited dielectric diaphragm may match this geometry and retain vertical sidewalls after release. Isotropic etching of the sacrificial layer may be utilized to create a tapered sidewall. When the deposited diaphragm matches this geometry, it permits a reduction in the maximum stress on the diaphragm by removing the sharp corner. Additionally, this tapered geometry allows a more uniform diaphragm sidewall thickness 504, further reducing stress concentration due to thin diaphragm thickness.

(iii) The upper electrode may be defined using sputtering and liftoff in order to provide step coverage over the $\alpha$-Si. Deeply undercut lift-off resist may be used for the upper electrode liftoff to prevent metal deposition on photoresist sidewalls, which could lead to the formation of "ears" that compromise diaphragm integrity subsequently.

(iv) During the diaphragm sealing step, which may be performed in a PECVD tool at 400° C., diaphragm dielectric layers return to neutral stress while the upper electrode becomes highly compressive, which can cause the thin unsealed diaphragm to bow into the substrate unless the electrode is designed appropriately. In particular, if the electrode extends to the outer perimeter of the diaphragm, the resulting moment on the diaphragm causes bowing that is permanently captured when PECVD is deposited in the diaphragm sealing step.

(v) The fifth lithography step is used to pattern the first dielectric layer of the diaphragm, composed of a stack of dielectric PECVD of silicon oxide, nitride, and oxide (200/1900/200 nm, ONO) plasma etched to create access slits (0.8×5.0 µm²) for the later use of $XeF_2$ etchant gas. A low stress (80 MPa) silicon nitride recipe may be employed to reduce shear force; excessive stress can cause layer delamination or diaphragm rupture after release. Compressive silicon dioxide has traditionally been used to compensate highly tensile stress nitride [19]; in accordance with embodiments of the present disclosure, however, silicon oxide is utilized as a protective cover for the nitride during the $XeF_2$ etch, which would otherwise slowly attack the silicon rich low-stress nitride, weakening the structural integrity of the diaphragm. The grid of access slits with a 25 µm pitch permits rapid removal of the sacrificial $\alpha$-Si, limiting the $XeF_2$ exposure of unprotected nitride through the sidewalls of the slits.

(vi) Silicon nitride, oxide, and nitride (800/300/800 nm, NON) followed by ALD $Al_2O_3$ (100 nm) seal the diaphragm cavity at vacuum, may provide long term (>1 year) hermetic sealing.

Figure 6:
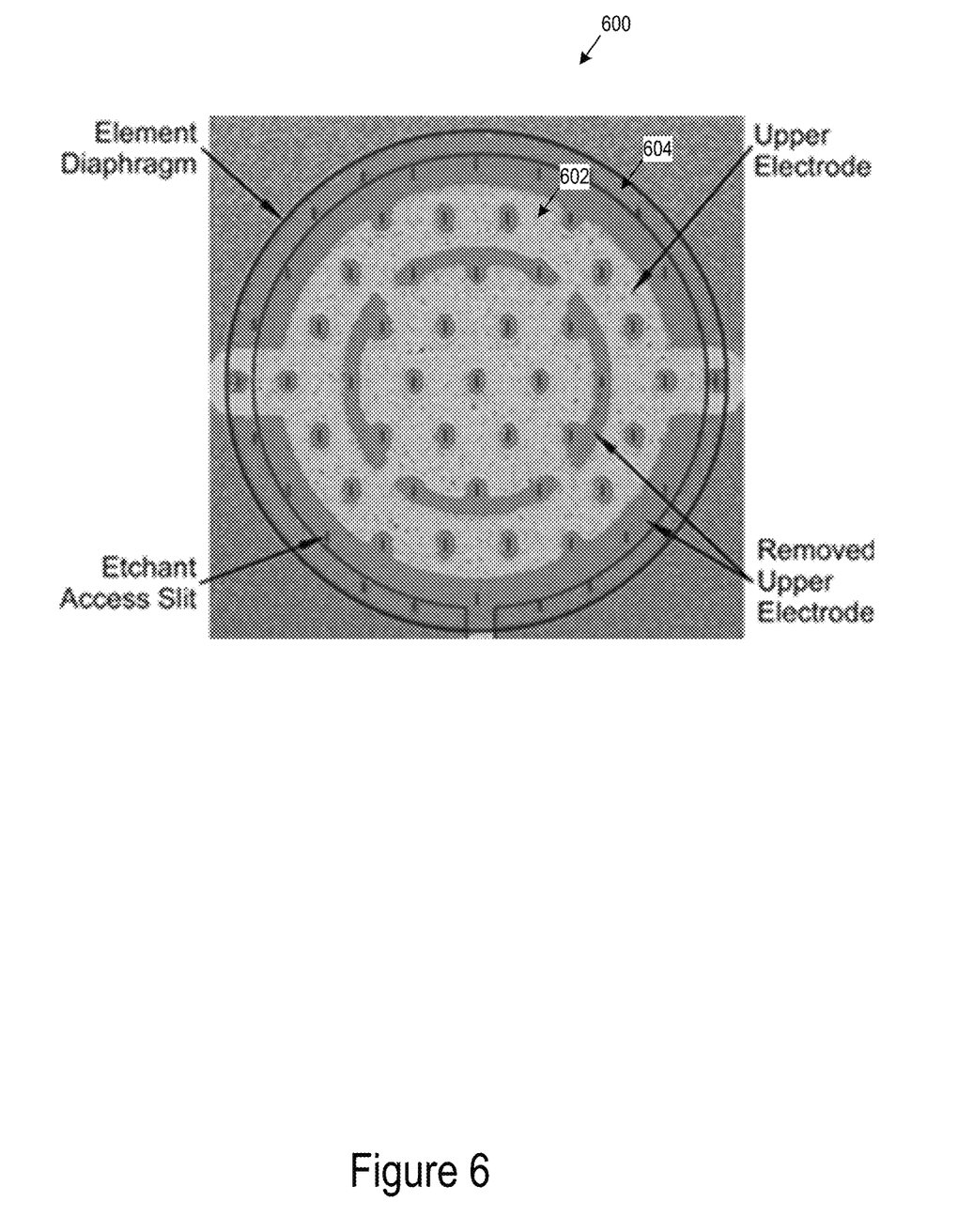
FIG. 6 shows an example layout for an example upper electrode and an example diaphragm.

In various implementations, the diaphragm may be protected from temperature-induced deformation between the temperatures of 15° C. (room temperature, diaphragm release) and 400° C. (deposition temperature during diaphragm sealing). If the unsealed diaphragm deforms downwards into the substrate, it may become immobilized during sealing and cease to operate as a pressure sensing element. If the unsealed diaphragm deforms upwards out of plane, it may crack and rupture. These issues may be avoided through various temperature-effect-mitigation designs of the upper electrode layout. The layout of the upper electrode may be designed such that its impact on the deformation of the unsealed diaphragm is minimized. The effective stress of the unsealed diaphragm should remain tensile to prevent diaphragm deformation both immediately after release and during diaphragm sealing. The change in diaphragm stress is due primarily to the difference between the thermal expansion coefficients of the dielectric diaphragm and embedded upper electrode. FIG. 6 shows an example layout 600 for an example upper electrode 602 and an example diaphragm 604. Through the example design of the layout of the upper electrode 602, the change in effective diaphragm stress over a wide temperature range due to upper electrode expansion can be minimized. The expansion of the upper electrode has the greatest effect on diaphragm deformation when embedded at the perimeter of the diaphragm, from where it is preferably removed. Additional stress relief is created through the removal of metal in the interior of the diaphragm. The removed metal of the upper electrode in these areas permits the unsealed diaphragms to be fabricated without risking deformation (over the desired 385° C. temperature range) during diaphragm sealing.

Over a full-scale range of 30 MPa, one example sensor chip provided typical $\Delta C_{FSR}$ of ≈18,500 fF, $C_0$ of ≈3,900 fF, and sensitivity of 109 ppm/kPa. Because of the non-linear nature of the capacitive responses, the incremental sensitivity of the sensor chips varied with applied pressure. The sensitivity value of 109 ppm/kPa that is noted here (and also in Table 1) appears at the high end of the full-scale range, where the incremental sensitivity is at its lowest within value.

Table 1 show details for five working example chips.

| | C100 | 18C100 | 85C56-92 | 8C200 | 32C110-150 |
|---|---|---|---|---|---|
| Active Area [mm²] | 0.025 | 0.35 | 0.75 | 0.40 | 0.75 |
| FSR⁺ [MPa] | 30 | 30 | 70 | 0.07 | 0.11 |
| $C_0$ [pF] | 0.2 | 3.9 | 7.1 | 10.5 | 11.5 |
| $\Delta C_{FSR}$ [pF] | 1.1 | 18.5 | 32.3 | 0.9 | 3.2 |
| Response* [fF/kPa] | 0.023 | 0.42 | 0.46 | 12.9 | 29.0 |
| Sensitivity* [ppm/kPa] | 112 | 109 | 65.5 | 1,250 | 2,500 |
| Pressure Resol. [kPa] | 1.4 | 0.2 | 0.44 | 0.0039 | 0.0017 |
| Resolution, CDC [fF] | 0.05 | 0.12 | 0.20 | 0.05 | 0.05 |
| Bits | 14.4 | 17.3 | 17.3 | 14.1 | 16.0 |

⁺FSR: Full-scale range
*Lowest response/sensitivity, which are found at the high end of the full-scale range (FSR)

A second example sensor chip provided a typical $\Delta C_{FSR}$ of ≈32,300 fF over 70 MPa full-scale range, $C_0$ of ≈7,100 fF, and sensitivity of 65.5 ppm/kPa. The working example chips show that an array of differently sized or shaped diaphragms provides a response with a larger full-scale range relative to a uniform array.

A benefit of using dielectric substrates is the extreme reduction in parasitic capacitance. A large number of diaphragms (e.g., 85 in a working fabricated example chip) can be arrayed on a single sensor chip with 0.75 mm² active area, and a full-scale range that is 70 MPa.

Detailed investigation of the fabrication process was conducted to identify equipment limitations and design issues limiting performance and yield. Parametric analysis was used to identify device dimensions that would fall within the fabrication limitations. A pair of working example sensor chips were fabricated with homogeneous diaphragm arrays and another pair of working example chip were fabricated with heterogeneous arrays. One working sensor chip included 18 parallel ⌀100 µm diaphragms and provided 30 MPa full-scale range, $C_0$ of 3,900 fF, and 17.3 bit resolution; another sensor chip included 8 parallel ⌀200 µm diaphragms and provided 70 kPa full-scale range, $C_0$ of 10,500 fF, and 14.1 bit resolution. Yet another sensor chip included 85 parallel diaphragms between ⌀56 µm and ⌀92 µm in diameter, demonstrated a full-scale range of 70 MPa, $C_0$ of 7,100 fF, and 17.3 bit resolution; another sensor chip included 32 diaphragms between ⌀110 µm and ⌀150 µm in diameter, demonstrated a full-scale range of 110 kPa, $C_0$ of 11,500 fF, and 16.0 bit resolution. An additional sensor chip with a single ⌀100 µm diaphragm served as a reference. The temperature coefficient of offset was measured for sensor chip C100 and found to be 420 ppm °$C.^{-1}$ up to 200° C.

The architectures and techniques discussed herein may be used in various applications in which high resolution pressure sensing within a small form factor is need.

Figure 7:
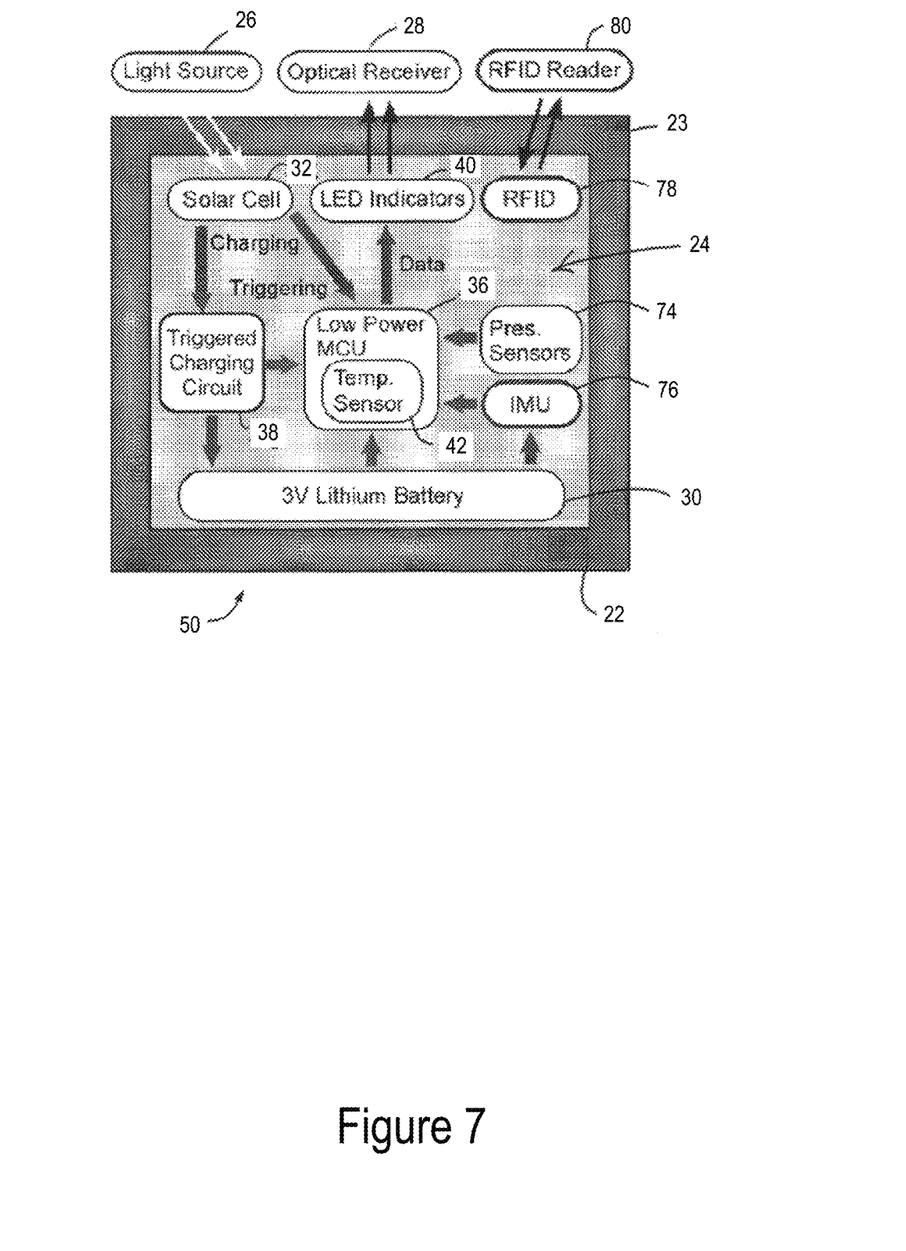
FIG. 7 shows an example electronic logging microsystem.

FIG. 7 shows an example electronic logging microsystem ("ELM"), designated generally as ELM 50, which is further described in U.S. Pat. No. 10,782,446. The ELM 50 may be implemented with one or more pressure sensor configurations as disclosed herein. ELM 50 includes a housing 22 with an electronic logging circuit in the form of an ELM circuit 24 that is hermetically sealed within the housing 22. An external light source 26 provides charging energy to the ELM 50 as well as encoded commands that cause ELM 50 to switch between various states, including a sleep state, detection state, and readout state. An external optical receiver 28 is used to read light pulses emitted from the ELM 50 for readout of stored data.

At least a portion of housing 22 is transmissive to electromagnetic radiation which allows energy from the light source 26 to be received by the ELM circuit 24. For example, the housing 22 may include an optically transmissive lid 23 that functions as an optical window for wireless charging by the light source 26. This also allows signaling light from the circuit 24 to be transmitted out of the housing for purposes of readout by the optical receiver 28. The ELM circuit 24 includes an energy source such as a battery 30, a transducer such as a solar cell 32 that converts the received light from light source 26 into electricity, a triggered charging circuit 38 connected to the solar cell 32 for recharging the battery 30, an electronic control unit ("ECU") 36 that is used for recording and readout of environmental data, and one or more electromagnetic radiation transmitters such as LEDs 40 that provide detectable light out of the housing 22 for receipt by the optical receiver 28.

ECU 36 may include a processor and/or non-volatile memory (not shown) as well as one or more sensors 42, each of which detects an environmental condition (e.g., temperature, pressure, etc.) and provides a sensor signal indicative of a value of the environmental condition. The ECU 36 may operate under control of a control program stored in memory (e.g., in the non-volatile memory) to receive and store in the non-volatile memory data representative of the sensor signals. A temperature sensor 42 is utilized and is included within a low power microcontroller unit ("MCU") that comprises the ECU 36. In other embodiments, the processor can be a component that is separate from any of the sensors or even separate from the memory used for storing the control program and sensor data.

The ELM 50 may include additional sensors including one or more pressure sensors 74 and an inertial measurement unit ("IMU") 76 that can provide three-axis acceleration and magnetic compass directionality data. It may also include an RFID tag 78 that permits each such ELM to be uniquely identified from other ELMs in use via an external RFID reader 80. The one or more pressure sensors 74 may be configured using any of the pressure sensors described above.

For ELM 50, the housing shown diagrammatically in FIG. 7 may be implemented in any manner suitable to provide appropriate environmental protection of the contents of the housing, while permitting optical communication into and out of the housing, and while enabling the embedded pressure sensor to detect the external pressures on the housing.

Figure 8:
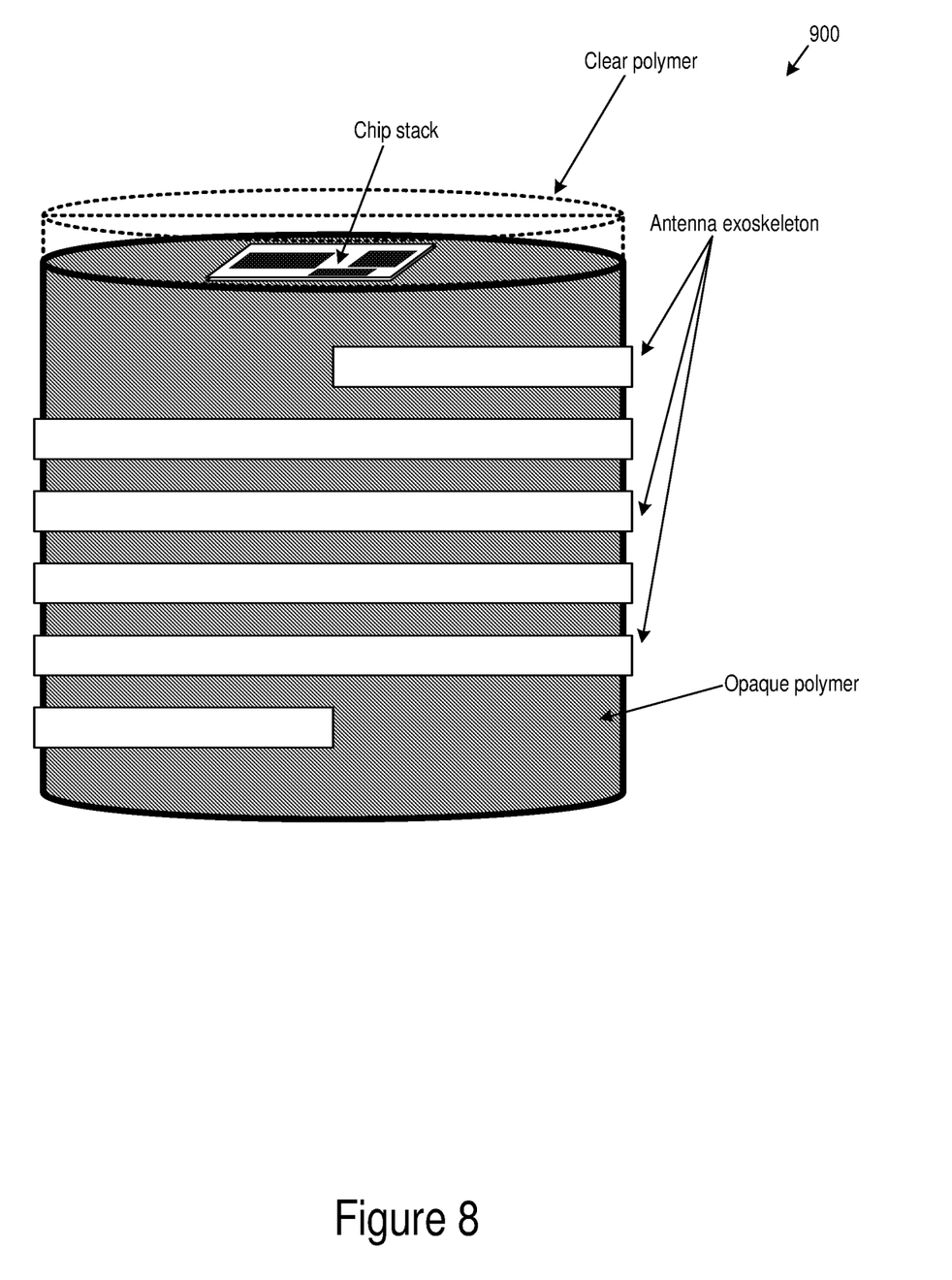
FIG. 8 shows an example housing design.

FIG. 8 shows an example housing design 900. The packaging of includes a rigid tubular housing or shell, and antenna exoskeleton helically wrapped about the shell. The shell may be made from a material that is resistant to abrasion and impact. This may be filled with a transparent soft polymeric material within which the electronics and sensors are located. The soft nature of the polymer protects the electronics from impact while permitting the ambient pressure to be transferred to the pressure sensor in an accurate manner. The transparent nature of the epoxy permits optical communication and charging of the battery through solar cells. The filling may also include a layer of harder epoxy, as needed; this layer may be opaque to shield the electronics. The tubular rigid exoskeleton may be comprised of, or enhanced by, an antenna coil, as shown. The metal coil can be commercially acquired or a custom manufacture.

Figure 9:
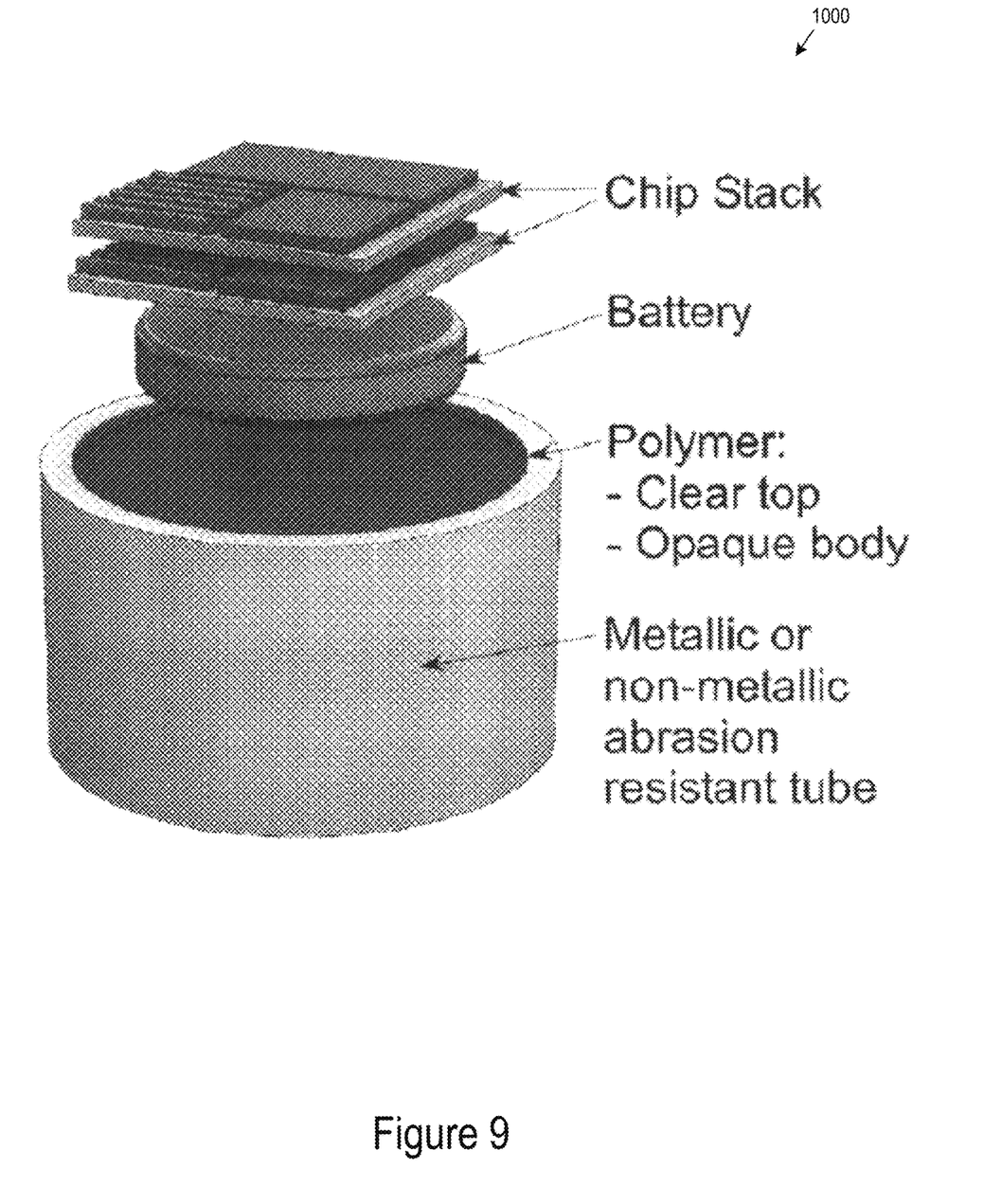
FIG. 9 shows an example package design.

For systems that do not need the additional antenna, the example package design 1000 shown in FIG. 9 could be used. This includes a metallic or non-metallic tube without the antenna coil. A non-metallic tube may be used for systems that use radio frequency ("RF") communications, while a metallic tube may be used for systems that use optical communications.

Various example implementations have been included for illustration. Other implementations are possible. Table 2 includes various examples.

TABLE 2

| Examples |
|---|
| 1. A capacitive device including: a dielectric substrate; a lower electrode terminal; a lower electrode layer patterned on top of the dielectric substrate, the lower electrode layer including a first lower electrode and a second lower electrode, the first and second lower electrodes coupled in parallel to the lower electrode terminal, the lower electrode layer, the lower electrode terminal or both in physical contact with the dielectric substrate; an upper electrode terminal; an upper electrode layer above the lower electrode layer, the upper electrode layer including a first upper electrode and a second upper electrode, the first and second upper electrodes coupled in parallel to the upper electrode terminal, the upper electrode terminal, the upper electrode layer, or both in physical contact with the dielectric substrate; a first diaphragm paired to the first lower electrode and the first upper electrode, at least a first portion of a sacrificial layer selectively removed from below the first diaphragm; a second diaphragm paired to the second lower electrode and the second upper electrode, the second diaphragm having a difference in size, shape, or both from the first diaphragm. |
| 2. The device or method of any of the other example in the table, where the device includes a pressure sensor. |
| 3. The device or method of any of the other example in the table, where the dielectric substrate includes a homogenous layer at least 50 microns thick. |
| 4. The device or method of any of the other example in the table, where the sacrificial layer is less than 1 micron thick, optionally, the sacrificial layer is about 500 nm thick. |
| 5. The device or method of any of the other example in the table, where the difference between the first and second diaphragms is determined to modify the response of the device over a range of pressures. |
| 6. The device or method of any of the other example in the table, where the device further includes a heterogenous array of diaphragms including the first and second diaphragms to change the capacitance response of the capacitive device relative to that produced by the first and second diaphragms. |
| 7. The device or method of any of the other example in the table, where the full-scale range of the heterogenous array is greater than 10 megapascals. |
| 8. The capacitive device of claim 1, where the first diaphragm includes a distribution of etchant apertures to allow etchant to permeate through the first diaphragm during removal of the sacrificial layer. |
| 9. The device or method of any of the other example in the table, where the second upper electrode includes one or more deformation apertures to mitigate deformation of the second diaphragm caused by temperature-induced effects on the second upper electrode. |
| 10. The device or method of any of the other example in the table, where the device further includes a diaphragm layer including: a first sub-layer including first and second diaphragms; and a second reinforcement sub-layer. |
| 11. The capacitive device of claim 1, where: the removed sacrificial layer includes a tapered sidewall; and the device further includes a diaphragm layer in which the first and second diaphragms are patterned, the diaphragm layer including a sloped sidewall due the tapered sidewall prior to removal of the sacrificial layer. |

TABLE 2-continued

Examples

12. A method of manufacture including; patterning, using a dielectric substrate process, a lower electrode layer on a dielectric substrate; patterning a sacrificial layer above the lower electrode layer; after patterning the sacrificial layer: patterning an upper electrode layer above the sacrificial layer; and patterning a diaphragm layer above the sacrificial layer; and after patterning the diaphragm layer: removing at least of portion of the sacrificial layer from below one or more diaphragms in the diaphragm layer.
13. The device or method of any of the other example in the table, where the dielectric substrate includes a homogenous dielectric substrate at least 50 microns thick.
14. The device or method of any of the other example in the table, where patterning the sacrificial layer includes patterning a layer that is less than 1 micron thick.
15. The device or method of any of the other example in the table, where: patterning the sacrificial layer includes patterning a layer with a tapered sidewall; and patterning the diaphragm layer includes patterning the diaphragm layer with a sloped sidewall due to the tapered sidewall of the sacrificial layer.
16. The device or method of any of the other example in the table, where removing at least of portion of the sacrificial layer includes etching the sacrificial layer by permeating etchant through one or more etchant apertures patterned into the one or more diaphragms.
17. The device or method of any of the other example in the table, where patterning the upper electrode layer includes patterning an upper electrode the upper electrode layer paired with a diaphragm in the diaphragm layer, the upper electrode including one or more deformation apertures to allow of temperature-induced deformation of the upper electrode without damage the diaphragm paired to the upper electrode.
18. The device or method of any of the other example in the table, where patterning the diaphragm layer includes: patterning a first diaphragm; and patterning a second diaphragm that differs from the first diaphragm in size, shape, or both.
19. The device or method of any of the other example in the table, where: patterning the lower electrode layer includes patterning first and second lower electrodes respectively paired to the first and second diaphragms, the first and second lower electrodes coupled in parallel to a lower electrode terminal; and patterning the upper electrode layer includes patterning first and second upper electrodes respectively paired to the first and second diaphragms, the first and second upper electrodes coupled in parallel to an upper electrode terminal different than the lower electrode terminal.
20. A capacitive pressure sensor device including: a dielectric substrate; a lower electrode terminal; a lower electrode layer on the dielectric substrate, the lower electrode layer including multiple lower sensor electrodes coupled in parallel to the lower electrode terminal; a sacrificial layer gap; an upper electrode terminal in physical contact with the dielectric substrate; an upper electrode layer separated from the lower electrode layer by the sacrificial layer gap, the upper electrode layer including multiple upper sensor electrodes each paired to a respective lower sensor electrode and coupled in parallel to the upper electrode terminal; and a diaphragm layer disposed above the upper electrode layer, the diaphragm layer including at least two diaphragms that differ in size, shape, or both, the at least two diaphragms each disposed above a respective upper sensor electrode.
21. The device or method of any of the other example in the table, where at least a second portion of the dielectric layer is selectively removed from below the second diaphragm.
22. A method of manufacture including; patterning a sacrificial layer above a substrate; patterning a diaphragm layer above the sacrificial layer, at least a portion of the diaphragm layer including a distribution of etchant slits; and feeding an etchant through the etchant slits to remove the sacrificial layer.
23. The device or method of any of the other example in the table, where the distribution of etchant slits includes: a grid distribution; a non-grid distribution with a spatial uniformity above pre-defined measure; or a non-grid distribution with selected slit placement.
24. A method of manufacture including; patterning a sacrificial layer above a substrate, the sacrificial layer including a substantially non-vertical sacrificial sidewall; patterning a diaphragm layer above the sacrificial layer forming a relatively thicker diaphragm sidewall above the substantially non-vertical sacrificial sidewall than would have been formed on a substantially vertical sacrificial sidewall; and removing at least of portion of the sacrificial layer to rely on the diaphragm sidewall to hold at least a diaphragm portion out of contact with the substrate in a resting position.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A capacitive device including:
a dielectric substrate;
a lower electrode terminal;
a lower electrode layer patterned on top of the dielectric substrate, the lower electrode layer including a first lower electrode and a second lower electrode, the first and second lower electrodes coupled in parallel to the lower electrode terminal, the lower electrode layer, the lower electrode terminal or both in physical contact with the dielectric substrate;
an upper electrode terminal;
an upper electrode layer above the lower electrode layer, the upper electrode layer including a first upper electrode and a second upper electrode, the first and second upper electrodes coupled in parallel to the upper electrode terminal, the upper electrode terminal, the upper electrode layer, or both in physical contact with the dielectric substrate;
a first diaphragm paired to the first lower electrode and the first upper electrode, at least a first portion of a sacrificial layer selectively removed from below the first diaphragm; and
a second diaphragm paired to the second lower electrode and the second upper electrode, the second diaphragm having a difference in size, shape, or both from the first diaphragm.

2. The capacitive device of claim 1, where the device includes a pressure sensor.

3. The capacitive device of claim 1, where the sacrificial layer is less than 1 micron thick.

4. The capacitive device of claim 1, where the difference between the first and second diaphragms is determined to modify a response of the device over a range of pressures.

5. The capacitive device of claim 1, where the device further includes a heterogenous array of diaphragms including the first and second diaphragms to change the capacitance response of the capacitive device relative to that produced by the first and second diaphragms.

6. The capacitive device of claim 5, where the full-scale range of the heterogenous array is greater than 10 megapascals.

7. The capacitive device of claim 1, where the first diaphragm includes a distribution of etchant apertures to allow etchant to permeate through the first diaphragm during removal of the sacrificial layer.

8. The capacitive device of claim 1, where the second upper electrode includes one or more deformation apertures to mitigate deformation of the second diaphragm caused by temperature-induced effects on the second upper electrode.

9. The capacitive device of claim 1, where the device further includes a diaphragm layer including:
a first sub-layer including first and second diaphragms; and
a second reinforcement sub-layer.

10. The capacitive device of claim 1, where:
the removed sacrificial layer includes a tapered sidewall; and
the device further includes a diaphragm layer in which the first and second diaphragms are patterned, the diaphragm layer including a sloped sidewall due the tapered sidewall prior to removal of the sacrificial layer.

11. A method of manufacture including;
patterning, using a dielectric substrate process, a lower electrode layer on a dielectric substrate, the lower electrode layer including multiple lower electrodes coupled in parallel;
patterning a sacrificial layer above the lower electrode layer;
after patterning the sacrificial layer:
patterning an upper electrode layer above the sacrificial layer, the upper electrode layer including multiple upper electrodes, each of the multiple upper electrodes paired to a respective one of the multiple lower electrodes; and
patterning a diaphragm layer above the sacrificial layer; and
after patterning the diaphragm layer:
removing at least of portion of the sacrificial layer from below one or more diaphragms in the diaphragm layer.

12. The method of manufacture of claim 11, where the dielectric substrate includes a homogenous dielectric substrate at least 50 microns thick.

13. The method of manufacture of claim 11, where patterning the sacrificial layer includes patterning a layer that is less than 1 micron thick.

14. The method of manufacture of claim 11, where:
patterning the sacrificial layer includes patterning a layer with a tapered sidewall; and
patterning the diaphragm layer includes patterning the diaphragm layer with a sloped sidewall due to the tapered sidewall of the sacrificial layer.

15. The method of manufacture of claim 11, where removing at least of portion of the sacrificial layer includes etching the sacrificial layer by permeating etchant through one or more etchant apertures patterned into the one or more diaphragms.

16. The method of manufacture of claim 11, where patterning the upper electrode layer includes patterning an upper electrode the upper electrode layer paired with a diaphragm in the diaphragm layer, the upper electrode including one or more deformation apertures to allow of temperature-induced deformation of the upper electrode without damage the diaphragm paired to the upper electrode.

17. The method of manufacture of claim 11, where patterning the diaphragm layer includes:
patterning a first diaphragm; and
patterning a second diaphragm that differs from the first diaphragm in size, shape, or both.

18. The method of manufacture of claim 17, where:
patterning the lower electrode layer includes patterning first and second lower electrodes respectively paired to the first and second diaphragms, the first and second lower electrodes coupled in parallel to a lower electrode terminal; and
patterning the upper electrode layer includes patterning first and second upper electrodes respectively paired to the first and second diaphragms, the first and second upper electrodes coupled in parallel to an upper electrode terminal different than the lower electrode terminal.

19. A capacitive pressure sensor device including:
- a dielectric substrate;
- a lower electrode terminal;
- a lower electrode layer on the dielectric substrate, the lower electrode layer including multiple lower sensor electrodes coupled in parallel to the lower electrode terminal;
- a sacrificial layer gap;
- an upper electrode terminal in physical contact with the dielectric substrate;
- an upper electrode layer separated from the lower electrode layer by the sacrificial layer gap, the upper electrode layer including multiple upper sensor electrodes each paired to a respective lower sensor electrode and coupled in parallel to the upper electrode terminal; and
- a diaphragm layer disposed above the upper electrode layer.

20. The capacitive pressure sensor device of claim 19, where the diaphragm layer includes at least two diaphragms that differ in size, shape, or both, the at least two diaphragms each disposed above a respective upper sensor electrode.

* * * * *